3,288,773
POLYMERIZATION OF A 1-OLEFIN IN THE PRESENCE OF A TERTIARY AMINE OXIDE AND A COORDINATION CATALYST
Arthur A. Harban and Charles W. Moberly, Bartlesville, Okla., assignors to Phillips Petroleum Company, a Corporation of Delaware
No Drawing. Filed July 17, 1963, Ser. No. 295,843
11 Claims. (Cl. 260—93.7)

This invention relates to a method for reducing the low molecular weight amorphous constituents in 1-olefin polymers. In another aspect, this invention relates to the use of novel catalyst adjuvants for reduction of pentane solubles in propylene.

Polymers of 1-olefins prepared in the presence of heterogeneous catalyst systems, such as for example polypropylene prepared using a catalyst comprising diethylaluminum chloride and titanium trichloride, contain greater or lesser amounts of low molecular weight amorphous materials which, when taken alone, are viscous oils or soft, tacky solids. The presence of these materials, sometimes referred to as "pentane solubles," in the polymer is believed to lead to undesirable color development and other detrimental degradation in physical properties of the polymer during subsequent processing or fabrication operations since in their absence these problems are not encountered.

Accordingly, it is an object of the present invention to provide a novel catalyst and adjuvant system for forming polymers of 1-olefins.

Another object of this invention is to provide a novel process for the production of 1-olefin polymers having a reduction of the low molecular weight amorphous constituents therein.

Other objects, advantages and features of the invention will be readily apparent to those skilled in the art from a study of the disclosure and the appended claims.

We have discovered that the formation of these low molecular weight amorphous polymeric components can be reduced by incorporation with the catalyst of a tertiary amine oxide as an adjuvant therefor. The tertiary amine oxides are compounds having the general formula

in which R is an alkyl group containing from 1 to 16 carbon atoms, the R's being the same or different, and the sum of the carbon atoms contained therein being in the range between 6 and 48. Examples of these compounds include dimethyl-tert-butylamine oxide, methyldiisopropylamine oxide, tri-n-butylamine oxide, tridodecylamine oxide, dimethyldodecylamine oxide, methyloctylhexadecylamine oxide, trihexadecylamine oxide, and the like. The amount of adjuvant used can be in the range between 0.05 to 15, preferably 0.1 to 5.0 mols per mol of transition metal component of the catalyst composition.

The invention is broadly applicable to the polymerization of olefins corresponding to the formula

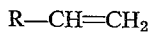

wherein R is selected from the group consisting of an alkyl radical containing from 1 to 4, inclusive, carbon atoms. Preferred olefins polymerized by the method of this invention include propylene, 1-butene, 1-pentene, 4-methyl-1-pentene, and the like.

The polymerization process of this invention is conducted in the presence of the well-known coordination catalyst system comprising two or more components wherein one component is an organometal compound, including compounds where one or more, but not all, organo groups are replaced by halogen, a metal hydride, or a metal of Group I, II or III, and the second component is a Group IV, V, VI or VIII (Mendeleef's Periodic System) metal compound. The organometal compounds referred to include, without limitation, alkyl, cycloalkyl or aryl compounds of mono-, di- or tetravalent metals, particularly aluminum, gallium, indium, beryllium, sodium, potassium, lithium, rubidium, cesium, magnesium, cadmium, mercury, zinc, barium, or such organometal compounds where one or more but not all of the alkyl, cycloalkyl or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, diethylaluminum chloride, trioctylaluminum, tridodecylaluminum, triphenylaluminum, triphenylgallium, diphenylberyllium, dicyclohexylberyllium, cyclohexylzinc fluoride, dibutylaluminum bromide, octylaluminum diiodide, dipropylgallium fluoride, dihexylgallium chloride, dicyclohexylgallium dibromide, eicosylgallium dibromide, ditetradecylgallium fluoride, diphenylindium chloride, octylindium difluoride, cyclohexylindium dibromide, methylberyllium bromide, and the like.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are applicable as a class, the most important members being sodium, magnesium and aluminum.

The compounds of the metals of Groups IV, V, VI and VIII of the Periodic System include the oxides, hydrides, halides, oxyhalides and salts of organic acids, usually having 20 or less carbon atoms, such as formic acid. It is usually preferred to employ compounds of titanium, zirconium, hafnium, chromium, thorium, molybdenum, vanadium, niobium, tantalum and iridium. Of these various compounds, it is generally preferred to employ the titanium halides, including the chlorides, fluorides, bromides and iodides, particularly the trichlorides, the tribromides and the triiodides of titanium.

A third catalyst component which can be advantageously used is an organic halide or metal halide where the organic radical has 30 or less carbon atoms and is an alkyl, cycloalkyl or aryl group. Specific examples include ethyl bromide, bromobenzene, cyclohexyl chloride and the like. Also applicable as third catalyst components are the alkali metal and ammonium halides, and aluminum halides (where the catalyst also includes another metal compound such as a titanium compound), halogens, hydrogen halides, organophosphorus-containing compounds, and peroxides.

The invention is particularly advantageous when the tertiary amine oxide is employed in conjunction with an initiator system comprising an alkyl aluminum and a titanium trihalide, for example, a trialkylaluminum or a dialkylaluminum halide plus a titanium halide, such as titanium trichloride.

The preferred initiator system, particularly in the mass polymerization of propylene, comprises a dialkylaluminum halide, more preferably a dialkylaluminum chloride, e.g. diethylaluminum chloride, and the reaction product of titanium tetrachloride and aluminum having the approximate formula $TiCl_3 \cdot \frac{1}{3} AlCl_3$.

The polymerizate removed from the reaction vessel will contain varying amounts of amorphous material, frequently in the neighborhood of 10 weight percent when employing the conventional organometal and titanium halide catalysts without the adjuvant of this invention. The permissible level of the amorphous fraction in the polymer product depends upon the ultimate use of the polymer, but in general the content should be reduced to a level below about 4 weight percent based on the polymerizate, preferably below about 3 weight percent to avoid detrimental effects arising therefrom. This invention accomplishes this desired result. The term "polymerizate" refers to the polymer of an olefin, such as polypropylene, as it is formed in the reactor and includes occluded diluent, catalyst residues, low and high molecular weight amorphous and crystalline homopolymers and copolymers and the like.

The term "amorphous polymer" as used herein refers to that portion of the polymer of 1-olefin prepared in the presence of the heterogeneous catalyst system herein described which is soluble in pentane based on the determination described in Example I. "Amorphous polymer" is conventionally referred to as "pentane solubles."

The ratio of the catalyst components employed in the present process can be varied rather widely depending upon the particular monomer employed and the operating conditions. The mol ratio of the organometal compound, metal hydride or metal of Group I, II or III metal to the Group IV, V, VI or VIII metal compound is usually in the range of 1:1 and 10:1 with a preferred range of 2:1 and 5:1. The concentration of catalyst in the polymerization zone is usually in the range of 0.01 to 5 weight percent based on the monomer charged to that zone although lesser or greater amounts can be employed.

The amount of the tertiary amine oxide employed is in the range of between about 0.05 and about 15, preferably between about 0.1 and about 5 mols per mol of Group IV, V, VI or VIII metal compound. Conveniently, the tertiary amine oxide is charged to the polymerization zone along with the catalyst frequently as a solution in a hydrocarbon solvent, such as cyclohexane, heptane or the like, although it is acceptable to charge the tertiary amine oxide with either of the catalyst components or their admixture.

The polymerization of the 1-olefin with the catalyst and adjuvant of the invention can be conducted by any suitable means such as a solution process or the mass procedure and under conditions well known to those skilled in the art. As is well known to those skilled in the art, the polymerization of the alpha-olefins can be conducted in the presence of a hydrocarbon diluent which is inert and liquid under the conditions of the process and does not have a deleterious effect on the catalyst. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes and the like. The relative amounts of diluent and olefin employed in the polymerization depend upon the particular conditions or techniques used and are generally governed by the capacity of the apparatus to effect suitable agitation and heat removal. The polymerization can be conducted at a temperature varying over a rather broad range, for example at a temperature of −100 to 500° F. In general, pressures are satisfactory which are sufficient to maintain the reaction mixture substantially in the liquid phase.

Although the invention is not limited thereto, one particularly preferred method is the so-called mass polymerization system wherein the monomer, preferably the propylene, is liquefied and contacted in the reaction zone with a two or more component initiator system discussed hereinabove, preferably in the presence of hydrogen. When employing propylene as the monomer and diluent, a suitable temperature is in the range of about 0 to 250° F.

The process of the invention can be carried out as a batch process, e.g. by pressuring the olefin to be polymerized into a reactor containing a catalyst system, the adjuvant and the diluent. Furthermore, the process can be carried out continuously by maintaining the reactants in the reactor for a suitable residence time. The residence time employed in the continuous process can vary widely since it depends to a great extent upon the temperature and the specific olefin. However, the residence time in a continuous process generally falls within the range of 1 second to 5 hours or more. In a batch process, the reaction time can also vary widely, such as from 15 minutes up to 24 hours or more.

The treatment of the polymerizate subsequent to the polymerization step depends upon the type of process employed for the polymerization. For example in a solution process upon completion of the polymerization, by one suitable method, any excess olefin is vented and the contents of the reactor are treated so as to inactivate the catalyst and remove the catalyst residue. The polymer is then precipitated and separated from the diluent by decantation, filtration or other suitable method, after which the polymer is dried.

The adjuvant can be charged to the polymerization zone before or after the transition metal compound, or in admixture therewith. When charged as a mixture, it is frequently desirable to grind, e.g. in a ball mill, the adjuvant and the transition metal compound together prior to charging. Another advantageous method for adding the adjuvant is as a solution in a suitable solvent therefor.

As pointed out earlier the polymerization can be conducted as a solution process or as a mass operation, the latter being presently preferred. In a mass operation, the monomer serves as the reaction diluent, thus avoiding problems of solvent recovery, purification, etc. For such procedures the preferred catalyst is a combination of diethylaluminum chloride and the reaction product of titanium tetrachloride and aluminum having the approximate formula $TiCl_3 \cdot \frac{1}{3} AlCl_3$. While not essential, it is presently preferred to conduct the polymerization in the presence of elemental hydrogen as disclosed in copending application Serial No. 249,118, suitably charged before or together with the monomer.

The following example is presented further to illustrate the invention.

*Example*

In a series of runs, propylene was polymerized in a mass system using diethylaluminum chloride and the reaction product of titanium tetrachloride and aluminum having the approximate formula $TiCl_3 \cdot \frac{1}{3} AlCl_3$ as catalyst and conducting the reaction in the presence of elemental hydrogen. Combined with the catalyst as an adjuvant therefor was a measured amount of dimethyl-n-dodecylamine oxide. The runs were made in a 1-liter stainless steel reactor into which, after purging with propylene, were charged the catalyst components, the adjuvant, hydrogen and 150 grams of propylene. Reaction was conducted at 130° F. for 2.5 hours, after which the unreacted propylene was vented and the polymer recovered. From the reactor the polymer was transferred to a 500 ml. graduated cylinder to which was then added 450 ml. pentane. About once each hour for 4 or 5 hours the cylinder was shaken to ensure thorough contacting of the polymer with pentane. The cylinder was allowed to stand overnight, after which a 200 ml. aliquot of the solvent was removed to a weighed vessel from which the pentane was evaporated. After removal of the pentane, the solid residue was heated at 110° C. for 15 minutes, cooled and weighed. Pentane solubles in the total polymer were then calculated. Data on these runs are given below:

| Run No. | DEAC [a] (gr.) | RP [b] (gr.) | Adjuvant [c] (gr.) | Hydrogen (liters at STP) | Pentane Solubles (Percent) | Reduction, Percent |
|---|---|---|---|---|---|---|
| 1 | 0.234 | 0.100 | 0.02 | 1 | 2.9 | 35.6 |
| 2 | 0.224 | 0.096 | 0.048 | 1 | 2.3 | 48.9 |
| 3 | 0.243 | 0.104 | | 1 | 4.5 | |

[a] Diethylaluminum chloride, 25% in heptane.
[b] Reaction product of TiCl$_4$ and Al having the approximate formula TiCl$_3$·1/3AlCl$_3$.
[c] Dimethyl-n-dodecylamine oxide (added as solution in cyclohexane).

These data show that significant reduction in pentane solubles is realized when dimethyldodecylamine oxide is used as an adjuvant for the catalyst.

Reasonable variations of this invention are possible in view of the foregoing disclosure and discussion without departing from the spirit or scope thereof.

We claim:

1. In a process for the production of a normally solid polymer of a 1-olefin having a low amorphous content comprising contacting under polymerization conditions a 1-olefin having the formula R—CH=CH$_2$ wherein R is an alkyl group having 1 to 4, inclusive, carbon atoms with a coordination catalyst prepared by admixing at least two essential components, one of said components being (1) a metal compound selected from the group consisting of Groups IV, V, VI and VIII metal compounds and another of said components being (2) selected from the group consisting of organometal compounds, metal hydrides, and metals of Groups I, II and III the improvement of conducting said polymerization in the presence of a tertiary amine oxide of the formula

in which R is an alkyl group containing from 1 to 16 carbon atoms, the R's being the same or different, and the sum of the carbon atoms being in the range between 6 and 48 whereby the pentane soluble polymer content is reduced.

2. The process of claim 1 wherein said tertiary amine oxide is present in an amount in the range between about 0.05 and 15 mols per mol of catalyst component (1).

3. The process of claim 1 wherein said tertiary amine oxide is dimethyl-n-dodecylamine oxide.

4. In a process for the production of a normally solid polymer of a 1-olefin having a low amorphous content comprising contacting an olefin corresponding to the formula RCH=CH$_2$ wherein R is selected from the group consisting of alkyl radicals containing from 1 to 4, inclusive, carbon atoms with a coordination catalyst prepared by admixing at least two essential components, one of said components being (1) a metal compound selected from the group consisting of Groups IV, V, VI and VIII metal compounds and another of said components being (2) selected from the group consisting of organometal compounds, metal hydrides and metals of Groups I, II and III the improvement of polymerizing said olefin in the presence of a tertiary amine oxide of the formula

wherein R is an alkyl group containing from 1 to 16 carbon atoms, the R's being the same or different, and the sum of the carbon atoms being in the range between 6 and 48, said tertiary amine oxide being present in an amount in the range between about 0.05 and 15 mols per mol of catalyst component (1), said contacting occurring at a temperature in the range of 0 to 250° F. and a pressure sufficient to maintain said monomer in the liquid phase, and recovering the solid polymer having a reduced pentane soluble content thus produced.

5. A process for the preparation of a normally solid polymer of propylene having a low amorphous content comprising contacting liquid propylene under polymerization conditions with a catalyst prepared by admixing a dialkylaluminum halide and a titanium halide in the presence of a tertiary amine oxide of the formula

wherein R is an alkyl group containing from 1 to 16 carbon atoms, the R's being the same or different, and the sum of the carbon atoms being in the range between 6 and 48, and recovering the solid polymer thus produced.

6. The process of claim 5 wherein said catalyst is prepared by admixing diethylaluminum chloride and the reaction product of titanium tetrachloride and aluminum having the approximate formula TiCl$_3$·1/3AlCl$_3$.

7. A process for the production of a normally solid polymer of propylene having an amorphous content of less than 4 weight percent comprising contacting propylene with a catalyst prepared by admixing diethylaluminum chloride and the reaction product of titanium tetrachloride and aluminum having the approximate formula TiCl$_3$·1/3AlCl$_3$ with liquid propylene employed as the medium for contact and in the presence of a tertiary amine oxide of the formula

wherein R is an alkyl group containing from 1 to 16 carbon atoms, the R's being the same or different, and the sum of the carbon atoms being in the range between 6 and 48, said tertiary amine oxide being present in an amount in the range between about 0.05 and 15 mols per mol of titanium chloride, said contacting occurring at a temperature in the range of 0 to 250° F. and sufficient pressure to maintain said propylene in the liquid phase, and recovering the solid polymer of propylene thus produced.

8. A novel coordination catalyst system for the production of a normally solid polymer of a 1-olefin having a low amorphous content which forms on mixing at least two essential components, one of said components being (1) a metal compound selected from the group consisting of Groups IV, V, VI and VIII metal compounds and another of said components being (2) selected from the group consisting of organometal compounds, metal hydrides and metals of Groups I, II and III in the presence of a tertiary amine oxide selected from the group having the formula

wherein said R is an alkyl group containing 1 to 16 carbon atoms, the R's being the same or different, and the sum of the carbon atoms contained therein being in the range between 6 and 48.

9. A novel catalyst system for producing polymers of 1-olefins having the low molecular weight constituents thereof reduced which forms on mixing (a) diethylaluminum chloride, (b) the reaction product of titanium tetrachloride and aluminum having the approximate formula $TiCl_3 \cdot \frac{1}{3}AlCl_3$, and (c) a tertiary amine oxide selected from the group having the formula

wherein R is an alkyl group containing 1 to 16 carbon atoms, the R's being the same or different, and the sum of the carbon atoms contained therein being in the range between 6 and 48.

10. The catalyst composition of claim 9 wherein said tertiary amine oxide is dimethyl-n-dodecylamine oxide.

11. The catalyst composition of claim 9 wherein said oxide is present in an amount within the range of 0.1 to 5.0 mols per mol of the transition metal component of the system.

References Cited by the Examiner
UNITED STATES PATENTS 3,100,764  8/1963  Jezl et al. _____ 260—93.7

JOSEPH L. SCHOFER, *Primary Examiner.*

L. EDELMAN, *Assistant Examiner.*